United States Patent [19]
Ward et al.

[11] Patent Number: 4,503,877
[45] Date of Patent: Mar. 12, 1985

[54] VALVE ASSEMBLY FOR AN AUXILIARY WATER FILTER

[75] Inventors: Raymond E. Ward, 1905 N. Val Vista, Mesa, Ariz. 85202; Alan R. Garner, Mesa, Ariz.

[73] Assignee: Raymond E. Ward, San Diego, Calif.

[21] Appl. No.: 394,907

[22] Filed: Jul. 6, 1982

[51] Int. Cl.³ ............................................ F16K 17/164
[52] U.S. Cl. .................................. 137/119; 137/467; 251/100
[58] Field of Search ................ 137/119, 467; 251/100

[56] References Cited
U.S. PATENT DOCUMENTS

| 1,271,625 | 7/1918 | Snyder | 251/100 |
| 2,638,108 | 5/1953 | Williams et al. | 137/102 |
| 4,224,962 | 9/1980 | Orszullok | 137/119 X |

FOREIGN PATENT DOCUMENTS

| 2213827 | 10/1972 | Fed. Rep. of Germany | 137/467 |
| 2455417 | 6/1975 | Fed. Rep. of Germany | 137/467 |
| 1552996 | 9/1979 | United Kingdom | 137/119 |

Primary Examiner—Martin P. Schwadron
Assistant Examiner—Stephen M. Hepperle
Attorney, Agent, or Firm—Harry M. Weiss; William W. Holloway

[57] ABSTRACT

A valve assembly adapted to be coupled to the spigot of a conventional sink faucet, which valve can selectively divert water from the spigot to either an auxiliary filter or to a drain. The valve incorporates a housing having a threaded inlet, an internal chamber and first and second outlets. A slidably mounted spool defines a valve head, and normally directs the flow toward the drain, but the spool can be shifted to divert the flow to the filter on either a continuous or a "single-shot" basis.

1 Claim, 5 Drawing Figures

VALVE ASSEMBLY FOR AN AUXILIARY WATER FILTER

BACKGROUND OF THE INVENTION

1. Field of the Invention

This invention relates generally to auxiliary water filters, and, more specifically, relates to a valve assembly adapted to be coupled to the spigot of a conventional faucet to divert the flow from the spigot, at will, to either the filter or the normal drain.

2. Description of the Prior Art

In the past, contaminated public water supplies, and accompanying public concerns, gave rise to a substantial demand for water-purification devices for home installation. A need existed for domestic water filter devices, and for the hardware to install those filter devices.

A need existed for a valve assembly, which could be mounted on a conventional kitchen-sink faucet, to allow selective delivery of a flow to a counter-mounted water filter.

More specifically, a need existed for a valve, which could be operated to divert a flow from a faucet to a filter on a "one-shot" basis, so that after the flow was terminated, subsequent flow delivery occured into the normal drain without further action by the user.

SUMMARY OF THE INVENTION

It is an object of the disclosed invention to provide an improved valve assembly for diverting tap water through an auxiliary water filter.

It is a further object to provide a filter-diversion valve for a faucet spigot, which valve can automatically reset itself to provide a drain-directed flow after the filter flow ceases.

It is another object to provide a filter-diversion valve, which can be set to direct any flow to either the filter or to the normal drain.

It is an object to provide a spring-loaded filter diversion valve having a fluid-shielded spring.

DESCRIPTION OF THE PREFERRED EMBODIMENTS

In accord with a first embodiment of this invention, a valve assembly for the spigot of a water faucet is disclosed, comprising: a housing defining an inner chamber, an inlet open to the inner chamber and adapted to be coupled to the faucet, a filter outlet adapted to be coupled to the housing, and a sink outlet; spool means having a spool slidably mounted within the chamber for blocking the filter outlet and opening the sink outlet when placed in a first position and for blocking the sink outlet and opening the filter outlet when placed in a second position; spring means in communication with the spool and the housing for biasing the spool toward the first position; and the spring means exerting sufficient force to shift the spool to the first position when the flow from the spigot ceases, but further exerting insufficient force to shift the spool from the second position while a flow from the spigot continues.

In accord with another embodiment of this invention, a method for controlling an auxiliary faucet-spigot valve for a water filter is disclosed, comprising the steps of: providing a valve body having an inlet, a sink outlet and a filter outlet; slidably mounting a spool within the body in a position to block either the sink outlet or the filter outlet from the inlet; loading the spool with a spring toward a position where it blocks the filter outlet; initiating a flow from the faucet; manually shifting the spool to block the sink outlet and open the filter outlet; and balancing the spool against the force exerted by the spring with the backpressure created by the flow leaving the filter outlet so that the filter outlet automatically remains open as long as the flow continues.

The foregoing and other objects, features and advantages of this invention will be apparent from the following, more particular, description of the preferred embodiments of the invention as illustrated in the accompanying drawings.

THE SPECIFICATION

Figure 1:
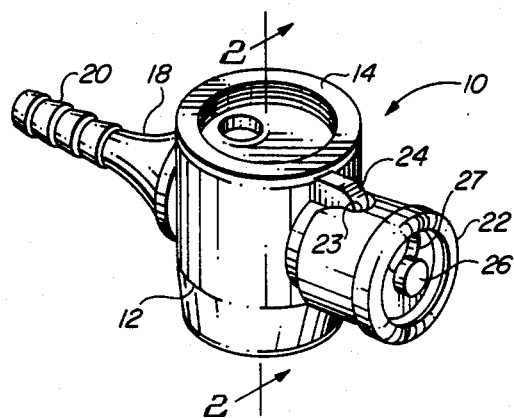
FIG. 1 is a perspective elevational view of the disclosed valve.

FIG. 1 is a perspective elevational view of the disclosed valve 10. A body 12 defines a threaded inlet section 14, adapted to mate to the threaded-end of a conventional, controllable, kitchen-type water faucet (not shown). An outlet section 18 as a series of ridges 20, arranged to internally grip a hose (not shown) which leads to a water filter (not shown). An operating handle 22, shown in the closed position, is axially aligned with the outlet section 18. The handle 22 has a notch 23, which is shown straddling a shoulder 24 on the valve body 12.

Figure 2:
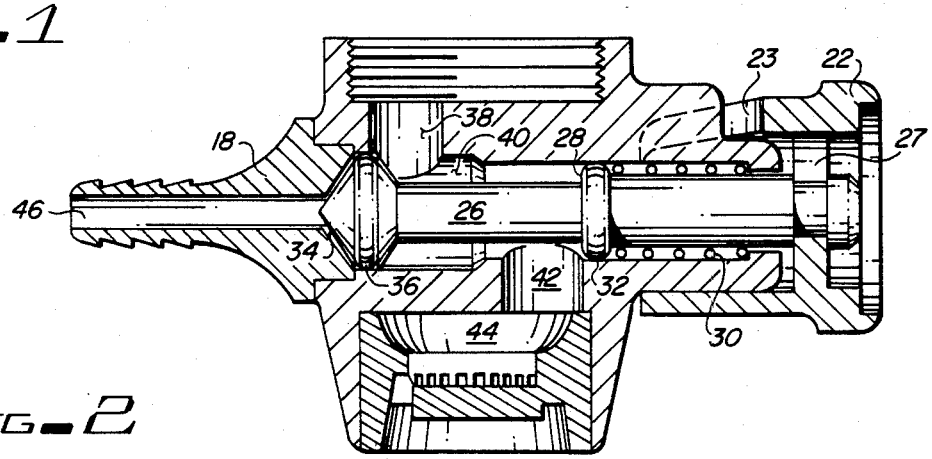
FIG. 2 is a sectional elevational view taken along line 2—2 of FIG. 1.

Referring then to FIG. 2, a sectional view taken along line 2—2 of FIG. 1 is shown. The handle 22 is rotatably coupled to a valve spool 26. An opening 27 permits the handle 22 to be slipped over an enlarged end of the spool 26. The valve spool 26 is installed in the body 12 through the opening occupied by the outlet section 18. A collar 28 on the spool 26 traps a spring 30 about the spool 26, and against the body 12 and prevents leakage around the handle-end of the spool 26. An o-ring 32 slidably seals the collar 28 to the body 12. The spool 26 also defines a valve head 34. The o-ring 32 slidably seals the valve head to the body 12, and protects the spring 30 from fluid-corrosion.

The valve body 12 defines an inlet opening 38, an internal cavity 40 and a sink outlet 42. The inlet opening 38 connects the inlet section 14 to the internal cavity 40. Preferably, the sink outlet 42 mounts an aerator cup 44, of conventional design. The spool 26 is shown in a sink-fow position, with the inlet opening 38 and the internal cavity 40 open to the sink outlet 42. By axially shifting the spool 26 to a filter-flow position, as hereafter described, the inlet opening 38 and the internal cavity 40 can be opened to a filter outlet 46 defined by the outlet section 18.

Figure 3:
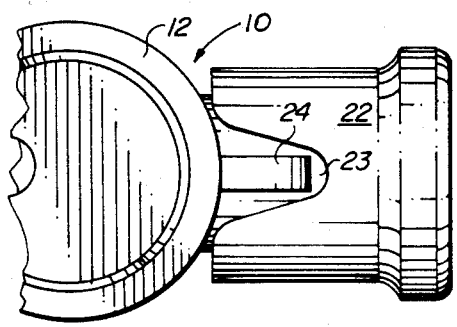
FIG. 3 is a top view of the handle-portion of the valve of FIG. 1.

In FIG. 3, a top view of the handle portion of the valve 10 shows the relationship between the notch 23 in the handle 22, and the shoulder 24 of the body 12. As shown, the spring 30 drives the spool 26 inward, causing the valve head 34 and an o-ring 36 to seal the inlet opening 38 from the filter outlet 46, while allowing access from the inlet opening 38 to the sink outlet 42.

Figure 4:
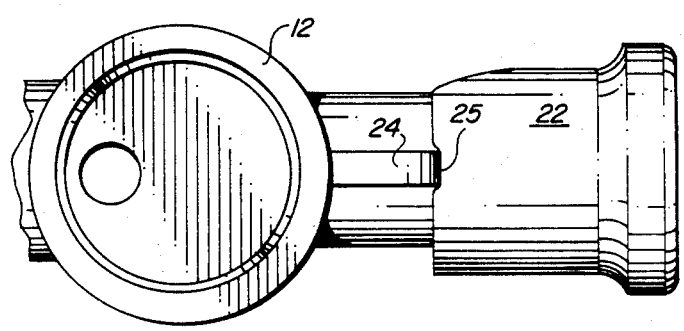
FIG. 4 is a top view similar to that of FIG. 3, with the handle shown in an extended position.

In FIG. 4, the handle 22 has been pulled away from the body 12, and rotated to bring the shoulder 24 to bear on a retaining detent 25 in the handle.

Figure 5:
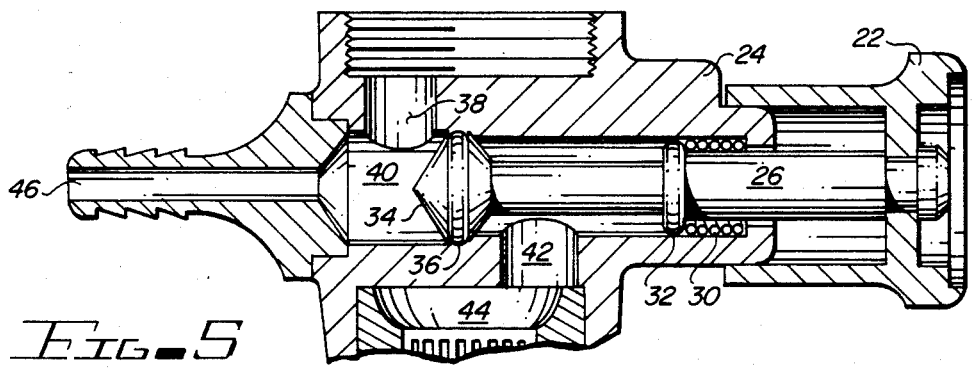
FIG. 5 is a sectional view similar to that of FIG. 2, with the handle and spool shifted to the filter-flow position.

Referring also to FIG. 5, a section similar to that in FIG. 2 is shown, but with the handle 22 withdrawn to the position shown in FIG. 4. As shown in FIG. 5, the valve head 34 and corresponding o-ring 36 seal the sink outlet 42 from the inlet opening 38, and cause a diversion of all of the faucet-flow through the filter opening 46. In such a handle position, opening the water faucet (not shown) will always cause a flow through the filter opening 46.

As long as a substantial flow continues into the filter outlet 46, the back-pressure operating on the filter-outlet-exposed face of the valve head 34 will keep the spool 26 driven fully against the pressure of the spring 30. Thus, the handle 22 only need be axially retracted to initiate the flow into the filter, and need not be held in place to maintain the flow. When the flow ends, the spring 30 shifts the spool 26 to provide a conventional sink-directed flow when the sink faucet is again turned on.

On the other hand, if it is desired to continue the flow through the filter outlet 46 whenever the sink faucet is opened, the handle 22 can be rotated as shown in FIG. 4, thereby locking the spool 26 in the filter-flow position and keeping the full flow diverted through the filter outlet 46.

The valve 10 can be easily installed on a conventional faucet by unthreading the aerator cup from the spigot, and replacing the cup with the valve 10. A filter-connected hose can be simply slipped over the outlet section 18, effecting a fluid connection to the filter. When a user wishes filtered water for a short period, the handle 22 can be briefly withdrawn while water is flowing from the faucet. The valve head 34 of the spool 26 then diverts water to the filter, and the backpressure acting on the exposed face of the valve head 34 keeps the spool 26 in the filter-flow position. When the faucet is terminated, the spring 30 returns the spool 26 to the sink-flow position. When the faucet flow is again started, the flow exits into the sink in a normal manner. When a user wishes to obtain filtered water whenever the faucet flow is started, the handle 22 can be axially retracted, and then rotated, to lock the spool 26 and the valve head 34 in the filter flow position, until the handle 22 is again rotated to permit the notch 23 to straddle the shoulder 24.

While the invention has been particularly shown and described with reference to preferred embodiments thereof, it will be understood by those skilled in the art that the foregoing and other changes in form and details may be made therein without departing from the spirit and scope of the invention.

I claim:

1. A valve assembly for the spigot of a water faucet comprising in combination:

a housing having internal threads at its top end for coupling to said faucet, said housing defining an inner chamber, said inner chamber including a first internal cylindrical bore and a second internal cylindrical bore, an inlet open to said first internal cylindrical bore and to said internal threads, said inlet having its longitudinal axis perpendicular to the longitudinal axes of said first and second internal cylindrical bores, a filter outlet coupled to said housing, and a sink outlet open to said second internal cylindrical bore, said sink outlet having its longitdinal axis perpendicular to the longitudinal axes of said first and second internal cylindrical bores;

spool means including a spool slidably mounted within said inner chamber for blocking said filter outlet and opening said sink outlet when placed in a first position and for blocking said sink outlet and opening said filter outlet when placed in a second position;

spring means in communication with said spool and said housing for forcing said spool to slide to said first position, said spool remaining in said first position while the flow from said spigot continues, and for exerting sufficient force to slide said spool to said first position from said second position when the flow from said spigot ceases, but further exerting insufficient force to slide said spool from said second position while a flow from said spigot continues;

sealing means including a first seal operably coupled to said spool proximate the filter outlet end of said spool for sealing said filter outlet when said spool is in said first position and for sealing said sink outlet when said spool is in said second position and a second seal operably coupled to said spool proximate said spring means for preventing water from coming into contact with said spring means in order to increase the useful life of said spring means and for preventing water from leaking from said housing; and a user-accessible handle means for permitting a user to manually slide said spool from said first position to said second position including a handle rotatably coupled to the spring means end of said spool, said handle having a substantially cylindrical configuration which fits around and slidably engages a cylindrically-shaped portion of said housing and having a peripheral edge facing said housing, said peripheral edge having a notch operably disposed to flank a shoulder of said housing when said spool is in said first position, said peripheral edge resting upon the end of said shoulder after said handle is first pulled outward and then rotated to turn said notch away from said shoulder thereby overcoming the force exerted by said spring means and placing said spool in said second position, said peripheral edge having a retaining detent for locking said spool in said second position, said shoulder removably engaging said retaining detent while said spool is locked in said second position.

* * * * *